United States Patent [19]

Kuriakose

[11] 4,419,336

[45] Dec. 6, 1983

[54] SILICON CARBIDE PRODUCTION AND FURNACE

[75] Inventor: Areekattuthazhayil K. Kuriakose, Gloucester, Canada

[73] Assignee: Norton Company, Worcester, Mass.

[21] Appl. No.: 362,701

[22] Filed: Mar. 29, 1982

[51] Int. Cl.³ ............................................ C01B 31/36
[52] U.S. Cl. .................................................. 423/345
[58] Field of Search ......................................... 423/345

[56] References Cited

U.S. PATENT DOCUMENTS

| | | | |
|---|---|---|---|
| 11,473 | 2/1895 | Acheson | 423/345 |
| 1,044,295 | 11/1912 | Tone | 423/345 |
| 2,178,773 | 11/1935 | Benner et al. | 423/345 |
| 3,375,073 | 3/1968 | McMullen | 423/345 |
| 3,773,553 | 11/1973 | Kamath | 423/345 |
| 3,989,883 | 11/1976 | Wiebke et al. | 423/345 |

*Primary Examiner*—Jackson Leeds
*Attorney, Agent, or Firm*—Rufus M. Franklin

[57] ABSTRACT

An improved acheson furnace structure is shown having insulated gate means for increasing the volume of coarsely crystalline silicon carbide produced in each cycle of the furnace together with a reduction in the volume of fire sand required to be recycled whereby to improve the efficiency of the furnace.

1 Claim, 4 Drawing Figures

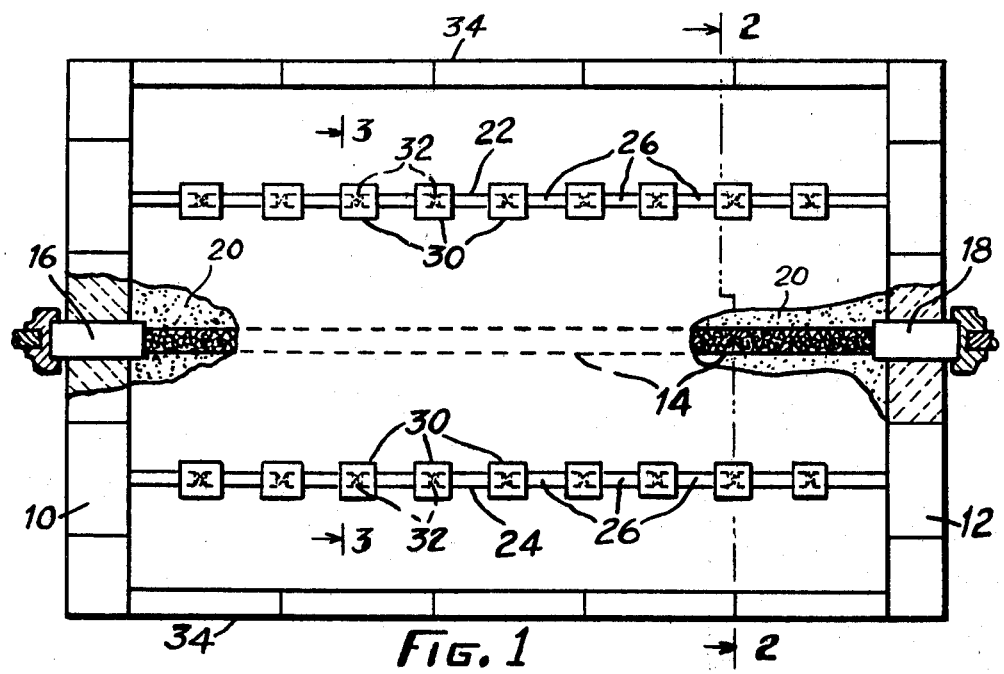
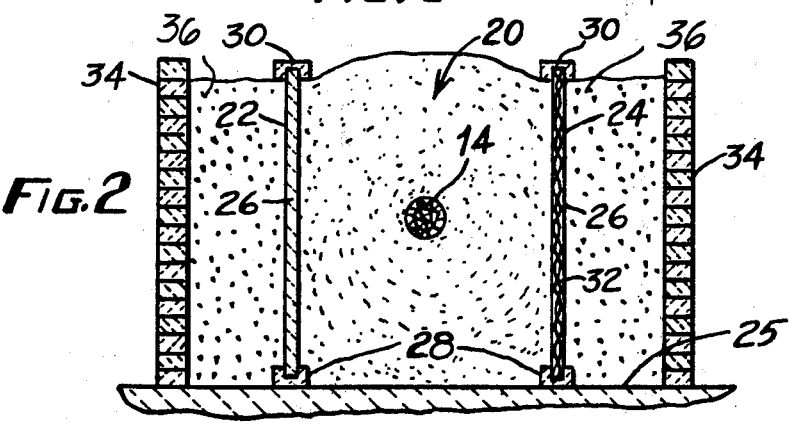
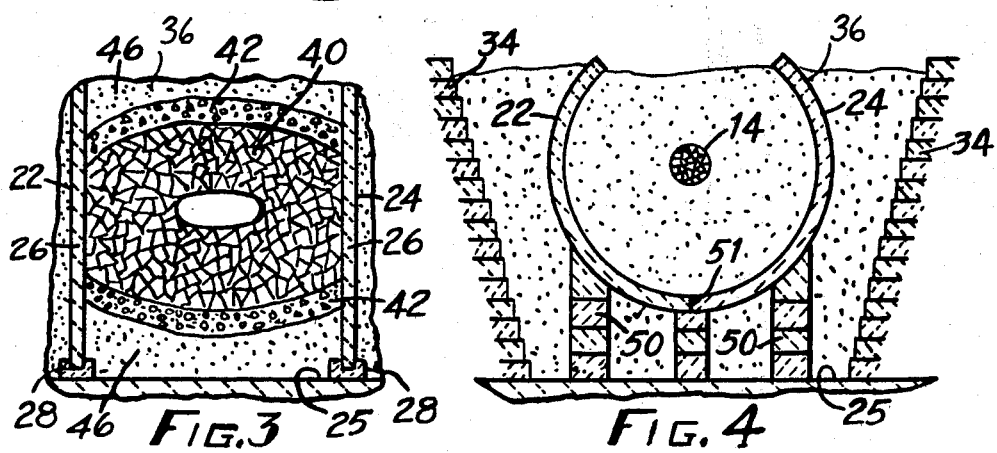

SILICON CARBIDE PRODUCTION AND FURNACE

FIELD OF THE INVENTION

This invention relates to an Acheson type silicon carbide production furnace.

BACKGROUND OF THE INVENTION

A description of an Acheson-type silicon carbide furnace is included in U.S. Pat. No. Re. 11,473 to Acheson re-issued Feb. 26, 1895. In the Acheson furnace, a carbon core resistor element is used and when the reaction has been completed, silicon carbide crystals surround the carbon rod in a zone that remains embedded in a more or less unreacted mix.

The Acheson furnace may be operated on a "green run" basis with a charge composed of fresh sand and coke that is heated to reaction temperatures to produce silicon carbide. During a green run about 50% of the mass is reacted to form silicon carbide crystals with impurities migrating from the reaction zone into a surrounding partially reacted mix that also contains some silicon carbide crystals, the partially reacted mix being called fire sand.

In order to avoid waste, the fire sand is mixed with additional sand and coke for making a "black run" in which the reacting mixture includes the small proportion of silicon carbide formed in the fire sand of the previous run, the impurities from that run, and the newly added sand and coke.

The unreacted and partially reacted mix left after each production run is recovered for reuse in subsequent production runs but, of course, this is wasteful in the use of energy and labor. It is heated up during the production run and then cooled down, it also requires labor for reprocessing and clean-up, and the mix then must be subjected again to a heating step in the subsequent production run.

Various attempts have been made to increase the yield of the most desired coarse crystalline silicon carbide product by increasing the size of the furnace, and increasing the power input. But such changes have not resulted in an overall increase in the efficiency of the desired silicon carbide because a larger central zone of decomposed silicon carbide material was produced and a larger band of fire sand that required recycling was inherently formed as the diameter of the reaction zone increased.

Examples of other prior art attempts to increase silicon carbide production or control the crystal growth in the resulting product are shown in U.S. Pat. No. 1,044,295 to Tone Nov. 12, 1912 wherein a zig-zag electrical resistance core structure was proposed; and U.S. Pat. No. 2,178,773 to Benner et al Nov. 7, 1939 which shows an induction heating arrangement making use of a centrally disposed susceptor to energize the reaction.

BRIEF DESCRIPTION OF THE INVENTION

An improved Acheson type furnace structure is here described for carrying the silica-coke reaction forward under conditions that result in the production of a greater proportion of coarsely crystalline silicon carbide with a substantial reduction in the amount of reclaimed mix required to be recycled after a production run. This increase in production efficiency is accomplished with a new gate or wall structure for containing the mass of ingredients to be reacted which permits the performance of a method of reacting the mass under more controlled temperature conditions to increase the proportionate yield of the desired coarsely grained silicon carbide product.

The wall for the Acheson furnace made in accordance with this invention includes a basic wall slab made of a material having a melting point above 2400° C., which has a low vapor-pressure at such an elevated temperature and is also inert to silicon carbide at this temperature. The preferred wall is basically a composite structure making use of a plurality of graphite slabs with a layer of carbon black heat insulation between the graphite elements and a support backing. The graphite is exposed directly to the reaction mix during performance of the process without detriment to the composite wall structure so that it is possible to construct the body of the furnace in a size adapted to contain a reacting mass that may be more completely converted to silicon carbide at temperatures within the range that are known to produce the desired more coarsely crystalline silicon carbide product.

IN THE DRAWINGS

FIG. 1 is a top plan view of a partially loaded furnace embodying this invention;

FIG. 2 is a section taken on line 2—2 of FIG. 1;

FIG. 3 is a partial sectional view of the furnace after completion of a run.

FIG. 4 is a sectional view similar to FIG. 3 showing an alternate gate structure.

DETAILED DESCRIPTION

The furnace shown in FIG. 1 includes end walls 10 and 12 following the pattern of the known Acheson type furnace shown in the patented prior art references cited above. The furnace is provided with the usual carbon or graphite resistor 14 made up of coke and/or graphite from previous runs disposed centrally through the reaction chamber in a trough formed in the mixture of sand and coke. The resistor is connected to electrodes 16 and 18 for passing the required current through the resistor to drive the reaction for producing silicon carbide. A suitable stoichiometric mix of silica and coke together with fire sand, if there is such material available, is positioned within the reaction chamber 20, to the level of the electrodes 16 and 18. After laying of the resistor 14, the furnace is completely filled with the mixture of coke and sand, as known in the art. The furnace chamber is defined by the end walls 10 and 12, side walls 22 and 24 and the floor 25 shown in FIGS. 2 and 3.

The novel features of this invention are best seen in FIGS. 1 and 2. The walls 22 and 24 are each formed of a series of substantially identical graphite blocks 26 standing in spaced apart vertical positions, the inner faces of which blocks define the sides of the reaction chamber 20. The graphite blocks or slabs which in this example of a small furnace are in the range of about 2.5 cm or 1" thick, 30 cm or about one foot wide and about 1 meter or approximately 3' high, may be held positioned at the floor level in grooved alumina bricks 28 to have their inner faces disposed generally parallel to the center-line of resistor 14. The upper ends of slabs 26 may be fixed with similarly grooved alumina bricks 30 that bridge the spaces left between the individual slabs. The spaces are in the order of about 2.5 cm or 1" to avoid making a good electrical contact between the plates which might otherwise provide a path for a short circuit between the resistor bar and the ground. The spaces between the adjacent edges of the slabs are each filled with a graphite felt strip 32. A space is provided behind the back sides of the slabs that face away from chamber 20 and the fire brick support walls 34 on the opposite sides of the furnace which spaces are about 15 to 30 cms or 6" to 12" wide, that are each adapted to be filled with carbon black powder 36. The graphite felt strips prevent the carbon black from flowing through the space provided between the slabs 26 and the wide masses of carbon black behind the graphite slabs 26 provide heat insulation to protect the refractory brick walls 34 from the reaction temperatures generated within the reacting mass held in the reaction chamber 20. To provide further protection, the inside surfaces of walls 34 may be lined with a layer of asbestos paper.

The reaction chamber 20 that is defined by the end walls 10 and 12, inner faces of the vertically disposed graphite slabs 26 and the floor 25 is designed to be loaded and unloaded either from above or from the ends of the furnace by removal of the portions of end walls 10 and 12, without removal of or disturbing the position of the respective insulated graphite slabs 26 forming walls 22 and 24.

When a furnace has been constructed as above described, the reaction chamber is loaded with a stoichiometric mixture of fresh sand and coke together with reclaimed fire sand from an earlier run as in a normal Acheson furnacing operation. The reaction mix is packed around the resistor 14 and then electrical power is fed to the resistor at the required voltages to generate the temperatures within the reacting mass needed to produce silicon carbide. Temperature measurements are made throughout the mass being reacted during the run and by means of an optical pyrometer means within graphite tubes disposed at several points along the walls, the temperatures developed within the reacting mass and next to the inner faces of the graphite slabs 26 are monitored. The run is continued until the temperature at the inner faces of slabs 26 reaches a range of at least 2000° C. to 2500° C. and preferably between 2000° C. to 2240° C. for at least one hour.

The reaction to produce silicon carbide requires sufficient temperature for the volatilization of the $SiO_2$ and requires about 2.6 KWH of energy per pound of fine crystalline silicon carbide initially converted from the reaction of sand and coke in the mix, at about 1800° C. Further energy is required to heat this finely crystalline silicon carbide to a temperature within a range up to no higher than about 2500° C. to promote crystal growth to the coarse crystalline form desired for certain commercial uses, but only 0.3 KWH per pound of silicon carbide is required for growing the coarse crystals once the fine crystalline reaction product has been made. It is evident that much the larger portion of the heat input is utilized at about 1800° C. to promote the initial silica and coke reaction to produce silicon carbide and while synthesis is proceeding the heat input is all used in the reaction. Such consumption of heat by the reaction tends to inhibit further reaction radially outwardly of the reaction zone. Large crystal growth cannot proceed until the reaction has been substantially completed and temperatures in the range of over 2000° C. can be produced. Until substantially all of the reacting sand coke mix surrounding the resistor element 14 in chamber 20 has been used up to form finely crystalline silicon carbide the reaction zone is centered within the mass of the mix but as the reaction proceeds the silicon carbide zone grows outward within the fire sand mix toward slabs 26 without permitting appreciable coarse recrystallization to take place.

The insulated wall structure disclosed herein confines the reacting mass so that substantially all of the sand and coke between the resistor element and the walls 22 and 24 of the reaction zone in the furnace is reacted to form silicon carbide and then the mass within chamber 20 can thereafter be progressively heated up from about 1800° C. to a temperature within a range where crystal growth or recrystallization takes place. By monitoring the temperature at the inner surface of the slabs 26 the reaction can best be controlled to assure the most efficient production of the coarse grained recrystallized silicon carbide as desired.

Referring to FIG. 3, when a reaction chamber 20 is formed having a cross-sectional area equal to about 1 square meter, a zone 40 of coarsely crystalline silicon carbide is produced that extends from one wall 22 to the opposite wall 24. This zone is surrounded top and bottom with fire sand zone 42 and beyond the zones 42 and 40 there is the zones 46 high in impurities and unreacted mix.

After the reaction has been completed and the recrystallization temperature has been maintained at the inner surfaces of the slabs 26 forming the side walls 22 and 24 of the reaction chamber 20, within a range of from 2000° C. to under 2500° C. for one hour, the electrical supply can be discontinued and the furnace allowed to cool for a period of 2 to 3 days. Upon unloading the furnace, it will be found that the coarse crystals have grown outwardly to the insulated side walls 22 and 24 but the top and bottom zones of the reacting mass which were not insulated are covered with a small volume of fire sand and partly reacted and unreacted mix as compared with the end product found in a conventional Acheson furnace where the fire sand surrounds the entire zone of reacted material.

The silicon carbide produced in the furnace described above and operated at the temperatures and for the time stated, was analyzed chemically and a portion taken from the interior of the coarsely crystalline zone 40 was compared with a portion taken from adjacent one of the walls or gates 22 or 24 with the following results.

|  | Product from Interior | Product at Gate |
|---|---|---|
| SiC | 99.28 | 98.85 |
| Free Carbon | 0.19 | 0.17 |
| Fe | 0.12 | 0.12 |
| Ti | 0.02 | 0.03 |
| Al | 0.21 | 1.04 |
| Ca | 0.01 | 0.01 |
| Mg | 0.01 | 0.01 |

The very high SiC content found in the portion next to the graphite gates as compared to that taken from the interior shows that there was an absence of fire sand and unreacted mix adjacent this carbon black insulated wall structure.

In another form of the invention as shown in FIG. 4, the walls 22 and 24 rather than being planar, may be shaped to generally concentrically match the contour of the growing silicon carbide pig. This will maximize the advantages of using the insulated gate structure for increased coarsely crystalline silicon carbide. The walls may extend partially or totally around the bottom of the mix to meet at 51. Supporting piers of refractory fire brick 50 are positioned as needed.

Materials other than graphite that may be used for the wall slabs are carbon and silicon carbide. The gate thickness should be held to a minimum in order to minimize the loss of heat due to absorption of energy from the reaction mass. It is desireable to cool the electrode end for protection against oxidation and to the extent possible, to insulate the ends of the furnace. Shorting of the current to ground must be avoided.

It is apparent that a relatively more complete conversion of the reacting mass of silica, coke and fire sand to the desired crystalline silicon carbide is produced at temperatures within a range known to produce coarsely crystalline material which results from using this insulated furnace structure. This construction utilizes the electrical input most efficiently. It has been found that with proper control of the process as described above, that the volume of reclaimed mix which must be recycled, can be reduced substantially thus saving energy and labor.

What is claimed is:

1. A method of making a larger percentage of coarsely crystalline silicon carbide in an Acheson furnace comprising packing the silica and coke ingredients forming a reaction mix around a centrally disposed resistive element heat source while confining the mix between gates that hold the mix in an insulated zone surrounding said source, supplying current to said source for raising the temperature within the mass to about 1800° C. for reacting all of the ingredients in the mix between the heat source and the gates to form finely crystalline silicon carbide, and then increasing the crystal size of the silicon carbide in the reacted mass by increasing the temperature of the reacted mass between the heat source and the gates to a temperature between 2000° C. to 2500° C.

* * * * *